United States Patent

[11] 3,575,471

[72] Inventor Frank L. Meyer
 Houston, Tex.
[21] Appl. No. 815,365
[22] Filed Apr. 11, 1969
[45] Patented Apr. 20, 1971
[73] Assignee Shell Oil Company
 New York, N.Y.

[54] SLURRY PIPELINE WITH RESTART BYPASS MANIFOLD
 7 Claims, 2 Drawing Figs.
[52] U.S. Cl. .................................................. 302/14, 302/64, 302/66
[51] Int. Cl. .................................................. B65g 53/30

[50] Field of Search .................................................. 302/14, 15, 16, 64, 66

[56] References Cited
UNITED STATES PATENTS
3,240,531 3/1966 Lippert et al. .................. 302/64

Primary Examiner—Andres H. Nielsen
Attorneys—Thomas R. Lampe and J. H. McCarthy

ABSTRACT: Method and apparatus for minimizing restart pressure of a shutdown slurry pipeline. A bypass manifold arrangement is provided in selected portions of a pipeline to enable plugs in the line formed by slumping of the slurry material solid phase to be restarted in segments. In addition, such arrangement permits bypass of selected plugs in the line.

PATENTED APR 20 1971 3,575,471

INVENTOR:
F. L. MEYER
BY:
Thomas R Lampe
HIS ATTORNEY

SLURRY PIPELINE WITH RESTART BYPASS MANIFOLD

The present invention relates to pipeline transport operations; and, more particularly, to a method and apparatus for minimizing restart pressure in a shutdown slurry pipeline.

Transportation by pipeline is a major and growing industry. With the use thereof formerly confined almost entirely to movement of water, gas and petroleum products, pipelines, with the advent of slurry transport, have become useful for long and short hauls of a wide variety of raw materials and finished products.

With respect to the pipeline transportation of materials in slurry form, problems may arise when such materials are moved through pipelines inclined to go over a hill or down into a valley. At these locations, during a planned or emergency line shutdown, the solids of the transported slurry will settle out vertically and may subsequently slide down the inclined portions of the pipeline, thereby causing a compacted plug which may be very difficult to dislodge and move when line shutdown is terminated and transport activities are attempted.

These difficulties are most commonly avoided by laying solids-carrying or slurry pipelines so that they do not exceed a slope or angle of inclination below which sliding or slumping does not occur. Alternatively, the inclined pipeline sections may be emptied or flushed at each shutdown. Obviously, these alternative prior art approaches are not always feasible or economical, especially in those situations where long and relatively steep slopes are encountered. Slopes of this nature are being encountered with increasing frequency as pipelines operations are being extended to new relatively inaccessible mountainous areas in the United States and elsewhere.

SUMMARY OF THE INVENTION

It is therefore a primary object of the present invention to provide an improved and economical apparatus and method whereby restart pressures may be minimized when resuming slurry transport in a pipeline wherein plugs have been formed due to slumping of the slurry material solid phase as a result of line shutdown.

This and other objects have been attained in the present invention by providing a method and apparatus for minimizing the restart pressure in a shutdown slurry pipeline wherein bypass manifold arrangements are installed along the pipeline in those locations where the likelihood of formation of plugs exists due to slumping of the slurry material solid phase. Each manifold includes a plurality of valved conduits which are in communication with the interior of the pipeline. By adjusting the valves associated with these pipes a plug in the pipeline may be wholly or partially bypassed when slurry transport is attempted.

DESCRIPTION OF THE DRAWING

The above-noted and other objects of the present invention will be understood from the following description, taken with reference to the accompanying drawing. In describing the invention in detail, reference will be made to the drawing in which like reference numerals designate corresponding parts throughout several views in which:

REferring now to FIG. 1, a given length of slurry pipeline 11 is illustrated in the position assumed thereby as the pipeline proceeds between three hills or mountains 12, 13 and 14. The terrain illustrated is typical of that encountered in pipeline laying activities, although it should be understood that the teachings of the present invention may be carried out in any topographical configuration or environment wherein a portion of slurry pipeline is inclined.

Figure 1:
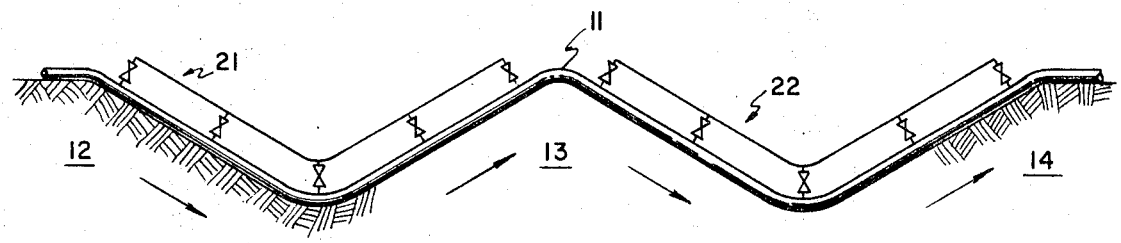
FIG. 1 is a diagrammatic view fragmental given length of slurry pipeline which has been modified in accordance with the teachings of the present invention.

The transportation of slurries consisting of solid particles in a fluid medium by use of pipelines similar to that disclosed in FIG. 1 is quite well known, and such expedient is finding increasing use, especially in those situations where the source of raw materials is relatively remote and inaccessible from the point of delivery, which may be a suitable processing plant, for example. In the disclosed arrangement, it may be assumed for purposes of illustration that the slurry material being transferred through pipeline 11 as by means of pumps (not shown) or by gravity, is moving through the line in the direction indicated by the arrows. However, the teachings of the present invention are, of course, applicable regardless of the direction of flow of the slurry.

As long as flow continues in the pipeline, the solid matter of the slurry will remain in suspension within the pumped liquid, even when the solid matter has a higher specific gravity than the liquid. If, however, the flow is stopped for any reason, i.e., the pipeline is shut down, such solid matter will settle out of suspension. In the situation where the line is horizontal or the slope of the line is insufficient to cause sliding of the settled solids, no problem is created by such settling out. Under these conditions, a liquid-rich channel remains open at the top of the line which allows the settled material to be resuspended with a minimum of difficulty upon resumption of flow.

A serious problem can exist when the pipeline must be inclined to go over a hill or down a valley, as illustrated, for example in FIG. 1. At these locations, the settling of solids followed by their sliding down the slope or slumping during a protracted shutdown can result in a compacted plug of material difficult, if not impractical, to move or resuspend without exceeding allowable pump or pipeline pressures. In the illustrated pipeline configuration, for example, such solids would slide downwardly into the valleys formed between hills or mountains 12, 13 and 14. The settled solids would then compact under its own weight to form plugs in the valleys in an obvious manner.

According to the present invention, removal and transport of such plugs is facilitated by providing an arrangement whereby each plug may be selectively dislodged in segments and/or whole plugs in the pipelines may be bypassed. Disposed in association with pipeline 11 are a plurality of bypass manifolds with two such manifolds indicated generally by means of reference numerals 21 and 22 in FIG. 1. The bypass manifolds are located in operative association with those portions of the line wherein slumping and plug formation by the slurry material solid phase could occur upon pipeline shutdown. This, of course, would be the valleys traversed by the pipeline as the line extends from one hill or mountain to another or at the end of the slope in the case of an only uphill or only downhill section pipeline.

Since the construction of all the bypass manifolds would be similar, only one such bypass manifold, i.e., manifold 21, will be described in detail. The number of bypass manifolds operatively associated with a given pipeline would, of course, depend upon the number of potential plug-forming sections in the line line.

Figure 2:
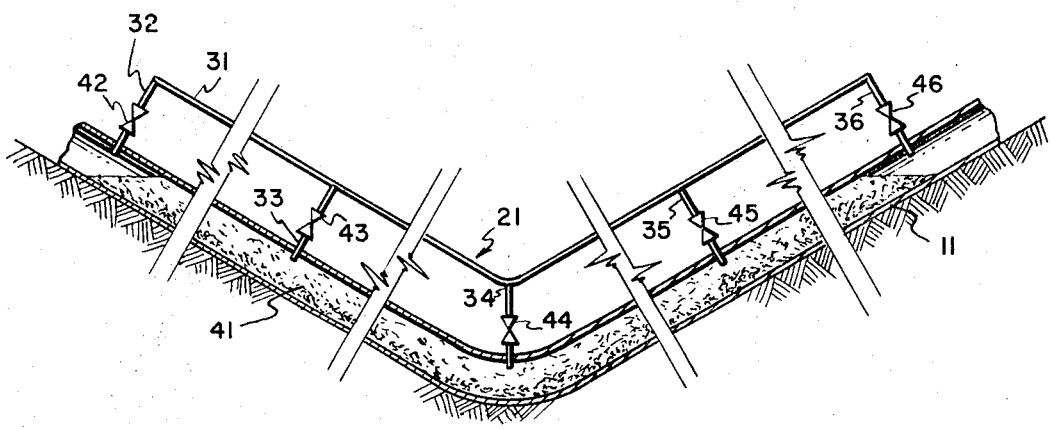
FIG. 2 is an enlarged cross-sectional, fragmental view in longitudinal projection illustrating selected sections of the length of the pipeline of FIG. 1 with a bypass manifold line operatively associated therewith in accordance with the teachings of the present invention.

FIG. 2 illustrates the construction of bypass manifold 21 in detail. The manifold comprises a continuously assembled length of pipe 31 which extends along a portion of pipeline 11 in substantial conformity with the configuration of the line as it extends into a valley from one hill or mountain to another. A series of conduits 32—36 extend from pipe 31 to pipeline 11. Communication may be selectively provided between the respective interiors of pipe 31 and pipeline 11 through any number of conduits 32—36 through suitable manipulation of valves 42—46 operatively disposed in the conduits with the valves being of any suitable commercial construction. During normal slurry pipeline transport operations, all of the valves are maintained in a closed condition. While bypass manifold 21 is illustrated as having only five such conduit-valve combinations, it should be understood that the number thereof associated with a given length of pipeline will depend upon the requirements of a given operating situation. For the proper operation of the arrangement according to the present invention, it is desirable that the length of the bypass manifold pipe, e.g., pipe 31, exceed the length of the plug formed in that section of pipeline due to slumping of the slurry material solid phase. Such plug length readily may be estimated by taking into account such factors as quantity and density of the slurry material solid phase, length of the inclined portions of the pipeline, etc. In FIG. 2, for example, a plug 41 is illustrated as having been formed in pipeline 11 due to the slumping of the slurry material solid phase upon shutdown of the pipeline for any reason, such as maintenance activities. It may be seen that the outermost conduits of bypass manifold 21, i.e., conduits 32 and 36, communicate with the interior of the pipeline beyond the uppermost levels of the plug 41. Due to the fact that slumping and plug formation has occurred, the pipeline 11 in the vicinity of conduit 32 and 36 will contain a liquid-rich slurry mixture.

In many cases a plug such as plug 41 will be difficult, if not impractical, to dislodge from its settling point of the pipeline upon restart without exceeding allowable pump or pipeline pressures. With the present arrangement, it is not necessary to reach these high pressures. Prior to actuation of the pump or pumps (not shown) associated with pipeline 11 to recommence slurry transport in the direction of the arrows shown in FIG. 1, valves 42 and 45, operatively associated with conduits 32 and 35, respectively, are opened to provide a flow path through these conduits and pipe 31. The fluid-rich slurry material will then be pumped along this to exit from conduit 35 within pipeline 11 and below a section of plug 41 lying above this exit point, i.e., that section of the plug lying to the right of conduit 35 as viewed in FIG. 2. This small segment will be relatively easy to dislodge from the rest of the plug and the solid phase material constituting the plug segment will readily mix with the slurry material fluid phase. After this has been accomplished, valve 44 is opened and valve 45 closed to provide a fluid phase flow path through conduit 32, pipe 31 and conduit 34. Once again, that portion of plug lying to the right of the exit conduit, i.e., exit conduit 34, will readily be dislodged whereupon the constituent solid phase material will be mixed with the slurry material fluid phase within the pipeline 11. This process of dislodging plug sections or segments, starting from the downstream end of the plug, is continued until all of plug 41 has been dislodged and mixed with the slurry material fluid phase. At this point all valves in the bypass manifold are closed and transport of the slurry material through pipeline 11 may be carried out in the normal manner.

While the operation of the bypass manifold arrangement has been described with particular reference to manifold 21, it is to be understood that all such manifolds operate in the same manner. In order to effectively utilize pump pressures in line 11, however, each manifold could be operated separately in the above-described manner, starting with the bypass manifold lying furthest downstream and progressing upstream in a sequential manner. For example, after the restart routine has been carried out with respect to bypass manifold 22 in FIG. 1, bypass manifold 31 would be manipulated as previously described. Any bypass manifold lying upstream (to the left as viewed in FIG. 1) would then be actuated in like manner after termination of the restart routine with respect to bypass manifold 21. Flow communication for restart of downstream segments of the pipeline would be provided through both the end conduits associated with all downstream bypass manifolds. If, for example, it is desired to dislodge a plug associated with bypass manifold 22, the plug 41 associated with bypass 21 would be completely bypassed by providing a flow path through conduit 32, pipe 31 and thence through conduit 36. By constructing pipe 31 of a length greater than maximum plug length of this may be readily accomplished.

As stated above, the number of the valve-conduit combinations employed in each bypass manifold will depend upon the circumstances, and the valves themselves may be of any type such as automatic, manual, or pressure relief type. The bypass manifolds may be permanently installed on the pipeline or temporarily attached thereto and any desired bypass manifold configuration may be utilized in carrying out the teachings of the present invention.

I claim:

1. Apparatus for minimizing restart pressure in a shutdown pipeline for carrying slurry material including a solid phase and a liquid phase, said apparatus comprising:
   a length of pipeline inclined over a portion of its length and having a portion wherein a plug of a predetermined size may be formed due to the slumping and compacting of the slurry material solid phase under the influence of gravity upon shutdown of slurry material transport in the pipeline; and
   bypass means operatively associated with said pipeline wherein the plug in the pipeline formed by slumping of the slurry material solid phase may be selectively wholly or partially bypassed upon pipeline restart, said bypass means having a first portion communicating with said pipeline upstream of said portion wherein a plug may be formed and at least a second portion in communication with said pipeline downstream of said portion wherein a plug may be formed.

2. The apparatus of claim 1 wherein said bypass means comprises at least one bypass manifold including a pipe, said first and second portions being conduits extending therefrom into communication with the interior of said pipeline, at least a third conduit extending from said pipe into the portion of said pipeline where a plug may be formed, and valve means associated with all of said conduits to selectively define a plurality of flow paths.

3. The apparatus of claim 2 wherein said pipe is of a length exceeding the length of the portion of said pipeline where said plug may be formed in the pipeline.

4. The apparatus of claim 2 wherein a plurality of bypass manifolds are disposed in operative relationship with said pipeline.

5. A method of minimizing restart pressure in a shutdown pipeline for carrying slurry material including a solid phase and a liquid phase, said pipeline being inclined over a portion of its length so that slumping and plug formation will occur in the pipeline by the slurry material solid phase upon pipeline shutdown, said method comprising:
   establishing a plurality of flow paths from the fluid-rich interior of the pipeline upstream of the plug to the interior of the pipeline upstream of the plug to the interior of the pipeline at preselected locations downstream lying within that portion of the pipeline containing the plug;
   pumping said fluid-rich slurry material selectively through said flow paths so that segments of the plug are broken off with the constituent solid phase slurry material mixing with the fluid-rich slurry material; and
   resuming slurry material flow wholly through the pipeline after all of the plug has been broken up and mixed with the fluid-rich slurry material.

6. The method of claim 5 wherein the segments of the plug are broken off the remainder of the plug starting from the segment lying furthermost in a downstream direction and continuing upstream.

7. The method of claim 5 wherein an additional flow path is provided between the fluid-rich interior of the pipeline upstream of the plug to the interior of the pipeline at a point lying downstream of the plug so that the fluid-rich slurry material may be pumped around the plug.